United States Patent [19]

Soroushian

[11] Patent Number: 5,547,504
[45] Date of Patent: *Aug. 20, 1996

[54] NON-SHRINK GROUT COMPOSITION WITH GAS FORMING ADDITIVE

[75] Inventor: Parviz Soroushian, East Lansing, Mich.

[73] Assignee: Board of Trustees operating Michigan State University, East Lansing, Mich.

[ * ] Notice: The term of this patent shall not extend beyond the expiration date of Pat. No. 5,489,333.

[21] Appl. No.: 518,048

[22] Filed: Aug. 23, 1995

Related U.S. Application Data

[63] Continuation-in-part of Ser. No. 401,308, Mar. 9, 1995, Pat. No. 5,489,333, which is a continuation of Ser. No. 142,610, Oct. 25, 1993, abandoned.

[51] Int. Cl.[6] .................................................. C04B 18/04
[52] U.S. Cl. .......................... 106/697; 106/713; 106/724; 106/737; 106/819; 106/820; 405/266; 405/267; 588/252; 588/255; 588/901
[58] Field of Search ................................ 106/713, 724, 106/697, 737, 816, 819, 820; 405/266, 267; 588/252, 255, 901

[56] References Cited

U.S. PATENT DOCUMENTS

| | | | |
|---|---|---|---|
| 4,750,274 | 6/1988 | Erdman, Jr. et al. | 34/39 |
| 4,980,030 | 12/1990 | Johnson et al. | 203/4 |
| 5,489,333 | 2/1996 | Soroushian | 106/697 |

FOREIGN PATENT DOCUMENTS 60-03327  6/1985  Japan.

OTHER PUBLICATIONS

"Standard Specifications for Packaged Dry Hydraulic Cement Grout (Non–Shrink)," (1991) (no month).
CRD–C 621–82B, "Corps of Engineers Specifications For Non–Shrinkage Grout" (1982) (no month).
Mehta, P. K., et al., "Concrete Structure, Properties and Materials," Prentice Hall, Inc., 548 (1993) (no month).
Environmental Information 13 to 17 (May 1992).
Hazard Communication Sheets 69561 (no date).
Toxicity Characteristics Leaching prodcedure (TCLP), Federal Register (1986) (no month).
Mehta, P. K., Cement and Concrete Research vol. 3, pp. 1–6 (1973) (no month).
McCarthy, G. J., et al., "Mineralogical Analysis of Advanced Coal Conversion Residuals by X–ray Diffraction" Proceedings, Tenth Ash Use Symposium, Report EPRS Tn–101779, Electric Power Research Institute, pp. 58–1–58.14 (1993) (no month).

*Primary Examiner*—Mark L. Bell
*Assistant Examiner*—Michael Marcheschi
*Attorney, Agent, or Firm*—Ian C. McLeod

[57] ABSTRACT

A non-shrink grout including Portland cement, sand and an additive which is a polymer incorporating at least one of a calcium compound and aluminum metal so as to be reactive with the cement. The grout when fresh expands during curing by gas formation and by hydration and expands when hardened. The grout is useful in construction.

27 Claims, 2 Drawing Sheets

NON-SHRINK GROUT COMPOSITION WITH GAS FORMING ADDITIVE

CROSS-REFERENCE TO RELATED APPLICATION

This application is a continuation-in-part of U.S. application Ser. No. 08/401,308, filed Mar. 9, 1995, U.S. Pat. No. 5489333 which is a continuation of Ser. No. 08/142,610, filed Oct. 25, 1993, now abandoned.

BACKGROUND OF THE INVENTION

(1) Field of the Invention

The present invention relates to a grout composition incorporating a polymer containing aluminum and one or more calcium compounds as gas forming and expansible additives which are admixed with Portland cement, and optionally sand. In particular, the present invention relates to the use of selected automotive paint sludge powders in the grout composition.

(2) Descriptions of Related Art

Grout is generally a mixture of sand and Portland cement which meets certain specifications, although for limited applications it can be prepared without sand as a filler. Non-shrink grouts are dimensionally stable and are used in applications such as: (1) precision grouting of machinery bases; (2) structural grouting of precast columns, steel columns, crane rails, precast beams, and the like; and (3) enclosing guard rails, sign posts, bridge seats, anchor bolts, guide rails, dowels, etc. Dimensional stability over time is a key requirement for non-shrink grout (ASTM C 1107 & CRD-C6 21) (ASTM C1107-91a, "Standard Specifications for Packaged Dry, Hydraulic Cement Grout (Non-Shrink)," (1991); and CRD-C 621-82B, "Corps of Engineers Specifications for Non-shrinkage Grout," (1982)).

Moisture loss from fresh and hardened cement-based grout leads to plastic (settlement) and drying shrinkage movements, respectively (Mehta, P. K., et al., "Concrete Structure, Properties and Materials," Prentice Hall, Inc. 548 (1993)). In order to produce expansive tendencies to overcome shrinkage in fresh grout, the prior art has resorted to gas production or expansion associated with the rusting of iron powders in grout (U.S. Grout Corporation, "Grouting Handbook," 200 (1983)). Fresh grout is grout which has not yet hardened and thus can expand. Hardened grout can expand as described in application Serial No. 08/142,610, now abandoned. In hardened grout, expansion is also produced through promoting expansive reactions (Mehta, P. K., et al., "Concrete Structure, Properties and Materials," Prentice Hall, Inc. 548 (1993)).

A process for producing dry powders from overspray in painting of various products, particularly vehicles, is described in Environmental Information 13 to 17 (May 1992). This publication suggests using the powder in cement blocks on roofing mastics essentially as an inert filler. There was no suggestion that such paint powders could be used for a grout. The drying process for the powder includes a heated screw conveyor which dries the powder. Volatile organic compounds are removed from the dried paint along with water during the drying. The process and apparatus is disclosed in U.S. Pat. No. 4,750,274 and U.S. Pat. No. 4,980,030.

Numerous polymer compositions have been suggested for use in concrete as inert fillers. Such uses of polymers are taught by Japanese Patent No. 60033276 (Abstract; 1985), for instance where foamed styrene is used for paver stones. Numerous other patents describe polymer powders used as fillers. These polymers are essentially insert and do not cause the concrete to expand.

There is a need for improved non-shrink grout compositions. There is particularly a need for grout compositions which are reliable and inexpensive.

OBJECTS

It is an object of the present invention to provide novel non-shrink grout compositions incorporating a gas forming additive. It is further an object of the present invention to provide a novel method for grouting. Further, it is an object of the present invention to provide an economical method and compositions for grouting. These and other objects will become increasingly apparent by reference to the following description and the drawings.

DESCRIPTION OF PREFERRED EMBODIMENTS

Figure 1:
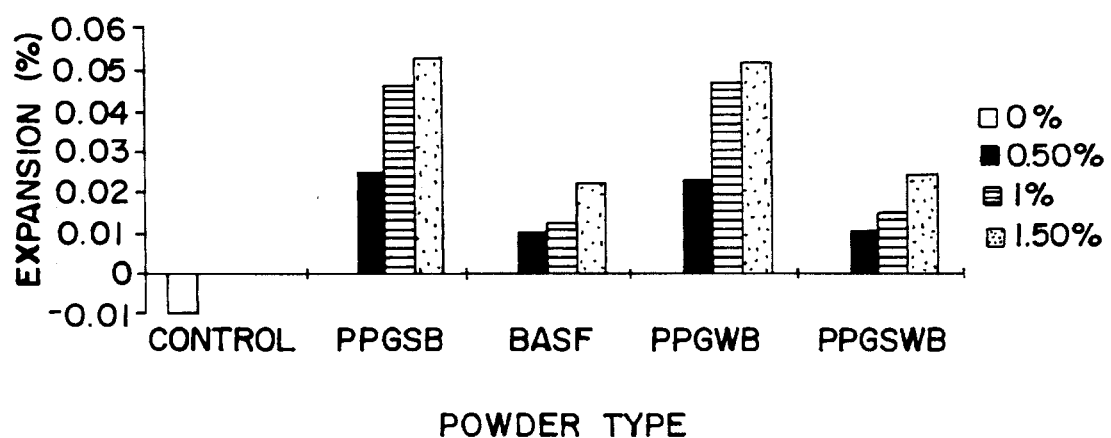
FIG. 1 is a graph showing the percentage expansion of a fresh grout of the present invention containing various percentages by weight of a paint polymer powder, wherein the polymer is solvent based (SB) or water based (WB) paint (Pittsburgh Plate Glass (PPG), Pittsburg, Pa. and BASF, Charlotte, N.C.), wherein the powder is produced from paint overspray at an automotive plant.

The present invention relates to a dry, non-shrink grout composition which is admixed with water to cure and form a grout which comprises in admixture: Portland cement having a particle size between about 1 and 100 micrometers; optionally silica sand having a maximum particle size of about 3 mm, wherein the weight ratio of sand to cement is between about 0.1 to 1 and 5 to 1; dried paint polymer powder particles selected to have a particle size between about 50 and 1000 micrometers and to contain between about 0.001 and 0.1 parts by weight of a calcium material per part of the particles and between about 0.001 and 0.1 parts of aluminum per part of the particles which react when combined with water to cause the grout when fresh to expand due to the formation of gas bubbles in the grout and to expand when hardened, wherein the particles are dispersed in the grout in an amount between about 0.5 and 5 percent by weight of the grout.

The present invention also relates to a grout which is produced from a dry, non-shrink grout composition which is admixed with water to cure and form the grout which comprises in admixture: Portland cement having a particle size between about 1 and 100 micrometers; silica sand having a maximum particle size of about 3 mm, wherein the weight ratio of sand to cement is between about 0.1 to 1 and 5 to 1; dried paint polymer powder particles selected to have a particle size between about 50 and 1000 micrometers and to contain between about 0.001 and 0.1 parts by weight of a calcium material per part of the particles and between about 0.001 and 0.1 parts of aluminum per part of the particles which react when combined with water to cause the grout when fresh to expand due to the formation of gas bubbles in the grout and to expand when hardened, wherein the particles are dispersed in the grout in an amount between about 0.5 and 5 percent by weight of the grout.

Further, the present invention relates to a method of grouting an area which comprises: admixing with water a grout composition which is admixed with water to form a grout which comprises in admixture: Portland cement having a particle size between about 1 and 100 micrometers; optionally sand having a maximum particle size of about 3 mm, wherein the weight ratio of sand to cement is between about 0.1 to 1 and 5 to 1; dried paint polymer powder particles selected to have a particle size between about 50 and 1000 micrometers and to contain between about 0.001 and 0.1 parts by weight of a calcium material per part of the particles and between about 0.001 and 0.1 parts of aluminum per part of the particles which react when combined with water to cause the grout when fresh to expand due to the formation of gas bubbles in the grout and to expand when hardened, wherein the particles are dispersed in the grout in an amount between about 0.5 and 5 percent by weight of the grout; and introducing the grout into the area, wherein the grout expands in the area.

The cement used is Portland cement. This material is a hydraulic binder which hardens at ambient temperatures and in the presence of moisture through the formation of hydrates of calcium silicate, calcium aluminosulfate, and the like. The solution of Portland cement and the pore water in hardened cement paste are highly alkaline. The cement paste is generally used as a binder for sand size to produce mortar.

The paint sludge powder has unexpectedly been found to generate a gas in fresh Portland cement grout mixtures. The preferred gas forming agent is present in dried paint sludge powder particles from overspray in a production setting, particularly from automotive painting. Automobile paint consists of pigments, solvent (for spray and flow qualities), resin, filler (e.g. titanium dioxide), and small amounts of other ingredients (e.g. plasticizers). The solvent will not be present after the paint hardens. The resins used are preferably acrylics and melamine; the resin binds the pigment particles together, and gives the film properties (e.g. corrosion resistance). The resin (acrylics, melamine) appears in the powder. Drying causes cross-linking of the resin which is present in the paint at lower molecular weights. Melamine formaldehyde is present in very small quantities both in the paint and in the chemicals added during the drying process. The automobile paints generally require heat curing. Calcium carbonate is part of the material placed on the grating in the spray booth in order to facilitate cleaning and ends up in the powder. Aluminum is a pigment additive which remains in the paint. The composition of the dried paints is set forth in Hazard Communication Sheets 69561. The sludges are polymers and generally contain or are formulated to contain various calcium and aluminum compounds and aluminum as fillers or bulking agents. The sludge is collected in water and dried. The drying is at 100° to 400° C. to remove volatile materials, preferably using the screw retort apparatus described in the prior art. The powder can contain water, even other liquids, so long as they do not interfere with the curing of the concrete.

Desirable gas forming properties can be obtained at an amount of a paint sludge powder-to-cement of between about 0.5 and 5% by weight, although for most applications 1 to 2% by weight is preferred. Larger amounts cause the grout to crack at the surface.

A number of issues were resolved in order to confirm suitability of paint sludge powder for the production of non-shrinking grout composition. Temperature and humidity generally play important roles in deciding the rates of expansion and hydration of the grout; the physical and chemical properties of Portland cement and mix proportions are other factors with potentially significant effects on the balance between the expansion and hydration rates. An interference by paint sludge powder with the hydration process of cement could have influenced the setting time and thus the water requirements and processing procedures of Portland cement grout. It was confirmed that the paint sludge powder did not adversely influence the resistance of grout to chemical and physical causes of deterioration, particularly to sulfate attack. The environmental impacts of using the paint sludge powder in concrete were found not to be a problem.

In producing the non-shrink grout:
 (1) Paint sludge powders obtained from different paint systems were screened and selected for use in the grout.
 (2) The chemical and physical characteristics of the selected paint sludge powders were determined and the variations in properties with time were assessed.
 (3) The rates of hydration and expansion in Portland cement concretes incorporating different paint sludge powders were assessed, considering broad ranges of proportioning, processing and curing variables and the expansion mechanisms were established.
 (4) The environmental impacts of using different paint sludge powders in concrete were determined.
 (5) The competitive prices for the paint sludge powders were determined.

Paint sludge powders were selected for use in concrete as expansive admixtures. Four types of sludge powder were evaluated:
 (1) BASF (Charlotte, N.C.) Solvent-Based
 (2) PPG (Pittsburg, Pa.) Water-Solvent Mixture Based
 (3) PPG Water-Based
 (4) PPG Solvent-Based Inductively coupled plasma-atomic emission spectroscopy techniques together with the ASTM C-311 test procedures were used to produce comprehensive information on the chemical constituents and physical properties of the paint sludge powders obtained from the two selected paint systems. Variations in the physical and chemical properties of the paint sludge powders within and between shipments were determined.

The effects of the paint sludge powders on the hydration process were assessed and the structure of hardened cement paste was investigated. The key variables are:
 Sludge powder type
 Sludge powder-to-cement ratio
 Fineness and chemical properties of Portland cement
 Water-cement ratio
 Aggregate sand content
 Dosage of air-entraining A statistical (fractional factorial) design of experiments was conducted using randomization and blocking concepts with sufficient replications of tests in order to derive sound conclusions, based on statistical analysis of test results, accounting for random experimental errors and variability of the paint sludge powder characteristics. Factorial analyses of variance provided information on the trends in the effects of different variables on the rates of hydration and expansion in the material.

Test data was generated in order to decide the paint sludge powder-to-cement ratios which produce a desirable balance between the rates of expansion and cement hydration for different mix proportioning and processing variables, sludge powder characteristics, and grout properties.

The solubility and mobility of any contaminants that are possibly present in the powder are limited to satisfy EPA requirement when the powder is used in the grout. Concrete materials incorporating different sludge powder types, with mix proportions and sludge powder contents within the selected ranges, were tested following the "Toxicity Characteristics Leaching procedure (TCLP)," Federal Register 1986, recommended by EPA (Risk Reduction Engineering Laboratory, 1989). Concrete materials are crushed in this test to pass through a 0.38 in. (9.5 mm) screen; a buffered acidic leaching solution is then added and the sample is agitated for 18 hours. The leaching solution is then filtered for analysis; maximum concentrations of different contaminants in the leached solution are then measured and compared against the EPA limits.

Non-shrink grouts generally present desirable resistance to physical and chemical causes of deterioration; there are, however, concerns regarding their sulfate resistance (Mehta, P. K., Cement and Concrete Research, Vol. 3, pp. 1–6 (1973)). Conventional expansive cements produce expansion by the reaction of sulfates with various aluminates; the rate of these reactions and the amount of sulfate provided in the cement determine whether an expansive cement reduces the sulfate resistance of concrete or not.

The durability characteristics of concretes incorporating the paint sludge powder as a gas forming additive under different physical and chemical causes of deterioration (particularly sulfate attack) was determined to be satisfactory. Concrete materials incorporating different paint sludge powder types, with the selected (optimum) ranges of sludge powder content, were prepared and their resistance to the following aging effects were determined:

Sulfate Attack (ASTM D-4130)
Repeated Freeze-thaw Cycles (ASTM C-666)
Deicer Salt Scaling (ASTM C-672)
Water Permeation (AASHTO T-277)
Abrasion (ASTM C-944)
Corrosion of Embedded steel (ASTM D-1674)

The use of two different paint systems provided sufficient data for establishing the mechanisms of the gas forming action of the paint sludge powder in concrete, and for deriving correlations between the performance characteristics of the non-shrink grout incorporating the sludge powder and the chemical/physical properties of the powder (which can be related to the paint system characteristics). This information was used to establish the trends in the effects of the paint sludge powder chemical characteristics on the performance of the sludge powder as a gas forming additive. These trends are used to establish limits on the paint system characteristics beyond which the suitability of sludge powder as an additive to produce a non-shrink grout would be questionable.

EXAMPLE 1

A chemical analysis of the powders was conducted using Inductively Coupled-Atomic Emission Spectroscopy (ICAP) technique. The results shown in Table 1 indicate that the powders are rich in calcium and aluminum compounds and aluminum metal. This suggests that the expansion could be caused by either hydration of hard-burnt calcium oxide or the reaction of calcium carbonate with the cement alkali and by reaction of the aluminum metal with the basic cement to form a gas (hydrogen).

TABLE 1

| Chemical Contents | Chemical Analysis of the Chrysler Paint Sludge Powders | | | | | |
|---|---|---|---|---|---|---|
| | PPGSB | | BASF | | | |
| | PPGSB-1 | PPGSB-2 | BASF-1 | BASF-2 | PPGWB | PPGSWB |
| B | 92.7 | <50.0 | 118 | <50.0 | 77.0 | <50.2 |
| S | 4530 | 1290 | 2040 | 4810 | 1520 | 1470 |
| Co | <2.49 | <5.0 | 32.5 | <5.0 | <2.49 | 13.6 |
| Mo | <9.98 | 161 | 13.0 | 20.7 | <9.96 | <10.0 |
| Sb | <25.0 | <50.0 | <25.0 | <50.0 | <24.9 | <25.1 |
| Hg | <25.0 | <50.0 | <25.0 | <50.0 | <24.9 | <25.1 |
| Na | 2870 | 666 | 1080 | 1290 | 2910 | <502 |
| Ba | 250 | 201 | 623 | 508 | 191 | 397 |
| Fe | 3860 | 3040 | 19400 | 4270 | 3850 | 11500 |
| P | 102 | 133 | 348 | 245 | 119 | 123 |
| As | <25.0 | <25.0 | 54.0 | <25.0 | <24.9 | <25.1 |
| Pb | <25.0 | <25.0 | <25.1 | <25.0 | <24.9 | <25.1 |
| K | 192 | 494 | 4980 | 424 | 220 | 1520 |
| Ca | 44000 | 40800 | 5780 | 20100 | 61500 | 2350 |
| Mg | 2190 | 858 | 2150 | 2630 | 2710 | 718 |
| Zn | 157 | 260 | 49.5 | 148 | 231 | 19.2 |
| Cr | 9.82 | <10.0 | 47.0 | 26.1 | 9.19 | 20.4 |
| Se | <200 | <200 | <200 | <200 | <199 | <201 |
| Ni | 29.7 | 23.7 | 53.9 | 55.2 | 26.7 | 24.8 |
| Cu | 778 | 619 | 88.7 | 486 | 688 | 33.0 |
| Mn | <2.49 | 18.7 | 106 | 76.7 | 78.9 | 70.1 |
| Al | 34100 | 20300 | 21900 | 34200 | 30700 | 8110 |
| Cd | <2.49 | <5.00 | <2.51 | <5.00 | <2.49 | <2.51 |
| Tl | <2.49 | <125 | <50.1 | <125 | <49.8 | <50.2 |

Chemical Analysis of Paint Sludge Powders (PPGSB = PPG solvent-based paint; PPGWB = PPG water-based paint; PPGSWB = PPG solvent/water-based paint; BASF = BASF paint)
All values are in ppm

EXAMPLE 2

In order to determine the specific calcium compounds present in the powders, mineral analyses were conducted using X-Ray diffraction techniques. The results suggest that calcium and aluminum compounds are minor. Calcium is dominantly present in the form of calcium carbonate. This suggests that reaction of calcium carbonate with cement alkali (and not the hydration of hard-burnt calcium oxide) is possibly the dominant cause of expansion with paint sludge powders.

The X-ray diffraction test results were also generated for grouts incorporating the powders; Type I and Type K expansive concretes were used as a basis for comparison. Table 2 shows the codes and chemical formulas for the various compounds which can occur in the concrete.

TABLE 2

| Mineral Analog Name | Nominal Chemical Formula | Code |
| --- | --- | --- |
| Lime | $CaO$ | LM |
| Anhydrite | $CaSO_4$ | Ah |
| Hannebachite | $CaSO_3 \cdot \frac{1}{2}H_2O$ | Hb |
| Portlandite | $Ca(OH)_2$ | Pl |
| Gypsum | $CaSO_4 \cdot 2H_2O$ | Gp |
| Calcite | $CaCO_3$ | Cc |
| Quartz | $SiO_2$ | Qz |
| Hematite | $Fe_2O_3$ | Hm |
| Ettringite | $Ca_6Al_2(SO_4)_3(OH)_{12} \times 26H_2O$ | Et |
| Thaumasite | $Ca_6Si_2(SO_4)_2(OH)_{12} \cdot 24H_2O$ | Tm |

(a) Table 2 is from McCarthy, G. J., et al., "Mineralogical Analysis of Advanced Coal Conversion Residuals by X-Ray Diffraction"Proceedings, Tenth Ash Use Symposium, Report EPRS TN-101779, Electric Power Research Institute, pp. 58-1–58.14 (1993).

It was apparent that there are different calcium and aluminum compounds present in grouts incorporating the paint sludge powders which can contribute to the expansion of the grout.

EXAMPLE 3

A grout mixture was prepared with the following mix proportions: silica sand (max. particle size 0.7 mm) cement= 2.0; water/cement=0.45; PPG paint sludge powder/cement= 0.02 by weight. Type III Portland cement was used. A commercial grout mix was used as a control. The grouts were subjected to the following tests (ASTM C1107 & CRD-C 621); unit weight, flow, set time, plastic shrinkage, compressive strength, and height change of hardened grout. The test results are presented in Table 3 versus the limits of ASTM C1107 and CRD-C 621 for non-shrink grout.

TABLE 3

| | Experimental Results | | |
| --- | --- | --- | --- |
| Test | 2% Powder | Commercial Grout Mix | ASTM/CRD-C Limit |
| Fresh Mix Height Change @Final Set | 3.3% | .33% | ≧0% & 4% |
| Fresh Mix Unit Wt (g/CM³) | 1.99 | 1.97 | |
| Final Set | 5¾hr. | 7 hr. | ≧8 hours |
| Height Change of the Hardened Cement, 1 day | 0.01% | 0% | ≧0% & ≧0.3% |
| Height Change of the Hardened Cement, 3 days | 0.01% | 0% | ≧0% & ≧0.3% |
| Height Change of the Hardened Cement, 14 days | 0.01% | 0% | ≧0% & ≧0.3% |
| Height Change of the Hardened Cement, 28 days | 0.01% | 0% | ≧0% & ≧0.3% |
| Compressive Strength, 1 day | 29.8 | 11.3 | ≧6.9 |
| Compressive Strength, 3 days | 37.5 | 29.6 | ≧17.2 |
| Compressive Strength, 7 days | 40.2 | 31.8 | ≧24.1 |
| Compressive Strength, 28 days | 46.7 | 53.8 | ≧34.5 |

The results presented in Table 3 indicate that the grout mix containing 2% paint sludge powder satisfies the requirements of non-shrink grout. In particular, shrinkage in the fresh and hardened states are prevented in the presence of powder.

In order to confirm gas formation in the grout incorporating the powder, linear traverse tests were conducted on grout mixtures with and without the powder. The number of voids per inch increased from 8 to 14 as the powder was added, and paste to void ratio decreased from 5 to 2.6. These results confirm the gas formation capability of the paint sludge powder in fresh cement-based mixtures.

EXAMPLE 4

Figure 2:
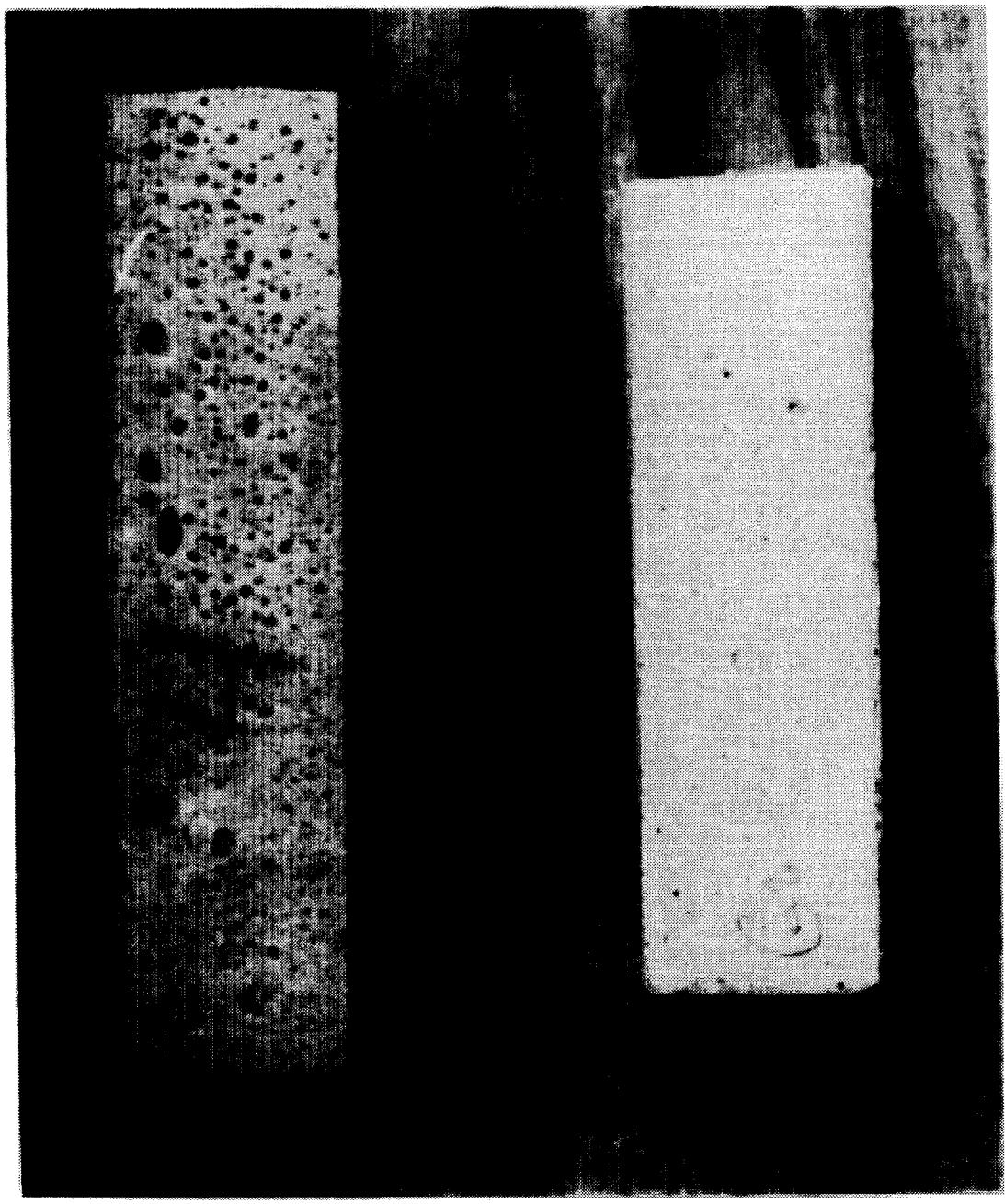
FIG. 2 is a photograph showing the non-shrink grout (left) with the paint powder additive showing the gas pockets compared to a grout without the powder additive (right) without the gas pockets.

Mortar mixtures were prepared with the following mix proportions: sand/cement=2.75; water/cement=0.50, powder/cement=0.5, 1.0 & 1.5% by weight. Type I Portland cement was used in this test. Restrained expansion tests (ASTM C 801) were conducted in order to determine the expansive tendencies in fresh mortar. The experimental results presented in FIG. 2 support the hypothesis that the powder causes expansive reactions in fresh mortar.

The paint sludge powder provides a unique capability to produce expansive tendencies in fresh grout mixtures through gas formation and promote expansive reactions in the hardened grout which help compensate drying shrinkage efforts. Preferably the addition of 2% powder by weight of cement to a conventional mixture of Portland cement, water and silica sand produces a grout mixture which satisfies the requirements of non-shrink grout.

The mechanism of reaction of the various compounds in the paint powder used in the present invention is unknown. The mechanism may involve a reaction with water and/or with other components of the Portland cement.

It will be appreciated that the paint sludge can be replaced with a polymer containing the calcium and aluminum compounds which are mixed and sprayed. In view of the negligible cost of the automotive sludge and the ready availability, there is no particular reason to produce these materials directly.

It is intended that the foregoing description be illustrative of the present invention and that the present invention be limited only by the hereinafter appended claims.

We claim:

1. A dry, non-shrink grout composition which is admixed with water to cure and form a grout which comprises in admixture:

(a) Portland cement having a particle size between about 1 and 100 micrometers;

(b) optionally sand having a maximum particle size of about 3 mm, and a weight ratio of sand to cement of between about 0.1 to 1 and 5 to 1;

(c) dried paint polymer powder particles selected to have a particle size between about 50 and 1000 micrometers and to contain between about 0.001 and 0.1 parts by weight of a calcium material per part of the particles and between about 0.001 and 0.1 parts of aluminum per part of the particles which react when combined with water to cause the grout when fresh to expand due to formation of gas bubbles in the grout and to expand when hardened, wherein the particles are dispersed in the grout in an amount between about 0.5 and 5 percent by weight of the grout.

2. The composition of claim 1 wherein the grout meets standards established by ASTM C-1107 and CRD-C621.

3. The composition of claim 1 wherein the powder is from dried sludge resulting from overspray from spray painting.

4. The composition of claim 1 which expands above about 0 percent and below 0.3 percent when hardened in a moist environment.

5. The composition of claim 4 having a compressive strength of greater than 34.5 MPa after twenty-eight days.

6. The composition of claim 5 having a final set is less than eight hours.

7. The composition of claim 6 wherein a height change at the final set is above 0 percent and less than 4 percent.

8. The composition of claim 1 wherein the sand has a particle size between about 0.1 and 3 mm.

9. The composition of claim 1 wherein the calcium material in the powder before drying is calcium carbonate.

10. The composition of claim 9 wherein the powder has been dried at a temperature between about 100° and 400° C. such that any volatile materials in the powder are removed and then the powder is ground and classified to produce the particle size.

11. The composition of claim 10 wherein the powder has been produced from overspray from spray painting.

12. The composition of claim 11 wherein the overspray is from painting a vehicle.

13. The composition of claim 1 which when mixed with water produces a hardened grout with a void volume more than that produced in a comparable grout mixture without the dried paint powder particles.

14. A grout which is produced from a dry, non-shrink grout composition which is admixed with water to cure and to form the grout which comprises in admixture:

(a) Portland cement having a particle size between about 1 and 100 micrometers;

(b) optionally sand having a maximum particle size of about 3 mm, and a weight ratio of sand to cement of between about 0.1 to 1 and 5 to 1;

(c) dried paint polymer powder particles selected to have a particle size between about 50 and 1000 micrometers and to contain between about 0.001 and 0.1 parts by weight of a calcium material per part of the particles and between about 0.001 and 0.1 parts of aluminum per part of the particles which react when combined with water to cause the grout when fresh to expand due to formation of gas bubbles in the grout and to expand when hardened, wherein the particles are dispersed in the grout in an amount between about 0.5 and 5 percent by weight of the grout.

15. The hardened grout of claim 14 wherein the grout meets standards established by ASTM C-1107 and CRD-C621.

16. The hardened grout of claim 14 wherein the powder is from dried sludge resulting from overspray from spray painting.

17. The hardened grout of claim 14 which expands above about 0 percent and below 0.3 percent when hardened in a moist environment.

18. The hardened grout of claim 14 having a compressive strength of greater than about 34.5 MPa after twenty-eight days.

19. The hardened grout of claim 14 having a final set in less than eight hours.

20. The hardened grout of claim 14 wherein a height change at the final set is above 0 percent and less than 4 percent.

21. The hardened grout of claim 14 wherein the sand has a particle size between about 0.1 and 3 mm.

22. The hardened grout of claim 14 wherein the calcium material in the powder before drying is calcium carbonate.

23. The hardened grout of claim 14 wherein the powder has been dried at a temperature between about 100° and 400° C. such that any volatile materials in the powder are removed and then the powder is ground and classified to produce the particle size.

24. The hardened grout of claim 14 wherein the powder has been produced from overspray from spray painting.

25. The hardened grout of claim 14 wherein the overspray is from painting a vehicle.

26. The hardened grout of claim 14 having a void volume about 14 voids per inch and a cement to voids ratio of about 2.6.

27. A method of grouting an area which comprises:

(a) admixing with water a grout composition to form a grout which comprises in admixture: Portland cement having a particle size between about 1 and 100 micrometers; optionally sand having a maximum particle size of about 3 mm, and a weight ratio of sand to cement of between about 0.1 to 1 and 5 to 1; dried paint polymer powder particles selected to have a particle size between about 50 and 1000 micrometers and to contain between about 0.001 and 0.1 parts by weight of a calcium material per part of the particles and between about 0.001 and 0.1 parts of aluminum per part of the particles which react when combined with water to cause the grout when fresh to expand due to formation of gas bubbles in the grout and to expand when hardened, wherein the particles are dispersed in the grout in an amount between about 0.5 and 5 percent by weight of the grout; and (b) introducing the grout into an area, wherein the grout expands in the area.

\* \* \* \* \*